US009188038B2

(12) United States Patent
Tomita et al.

(10) Patent No.: US 9,188,038 B2
(45) Date of Patent: Nov. 17, 2015

(54) PUMPING DEVICE

(75) Inventors: Yasuyoshi Tomita, Saitama (JP); Kiyoshi Fukuda, Kazo (JP)

(73) Assignee: UD TRUCKS CORPORATION, Saitama (JP)

( * ) Notice: Subject to any disclaimer, the term of this patent is extended or adjusted under 35 U.S.C. 154(b) by 0 days.

(21) Appl. No.: 13/994,800

(22) PCT Filed: Oct. 11, 2011

(86) PCT No.: PCT/JP2011/005674
§ 371 (c)(1),
(2), (4) Date: Jun. 17, 2013

(87) PCT Pub. No.: WO2012/081152
PCT Pub. Date: Jun. 21, 2012

(65) Prior Publication Data
US 2013/0276913 A1 Oct. 24, 2013

(30) Foreign Application Priority Data
Dec. 17, 2010 (JP) ................................ 2010-281816

(51) Int. Cl.
*F01N 3/00* (2006.01)
*F01N 3/08* (2006.01)
*F01N 3/20* (2006.01)

(52) U.S. Cl.
CPC *F01N 3/08* (2013.01); *F01N 3/208* (2013.01); *F01N 2610/02* (2013.01);
(Continued)

(58) Field of Classification Search
CPC ......... F01N 3/08; F01N 3/208; F01N 3/2066; F01N 11/00; F01N 13/009; F01N 13/0097; F01N 2610/02; F01N 2610/14; F01N 2610/1473; F01N 2610/1433; F01N 2900/1812; B01D 53/90; B01D 53/9477; B01D 53/9495; F04D 17/122; F04D 17/125; F04D 29/185; F04D 29/2211

USPC .................... 60/272–324; 137/465.5, 467.5; 417/299, 300, 302–304, 423.5; 217/4; 422/168–173; 416/120, 124; 415/101, 415/99
See application file for complete search history.

(56) References Cited

U.S. PATENT DOCUMENTS 7,878,183 B2 * 2/2011 Jaloszynski et al. .......... 123/533
2007/0266697 A1 * 11/2007 Nishina et al. .................. 60/277
(Continued)

FOREIGN PATENT DOCUMENTS

JP  5-118500     5/1993
JP  2005-337969  12/2005
(Continued)

OTHER PUBLICATIONS

International Preliminary Report of Appln. No. PCT/JP2011/005674 dated Jun. 27, 2013 with English translation.

*Primary Examiner* — Jason Shanske
*Assistant Examiner* — Kelsey Stanek
(74) *Attorney, Agent, or Firm* — Oliff PLC

(57) ABSTRACT

A pumping device having an identifying function is provided to allow cost reduction. A return channel and a delivery channel of a pump are connected to a suction tube equipped with a flowmeter, a return tube is connected to the return channel, a solenoid valve is disposed between the suction tube and the delivery channel, and a control unit identifying a fluid by a flow velocity difference of the flowmeter is disposed. The solenoid valve closes the delivery channel when a fluid flows in, the flowmeter measures a flow rate of a fluid sucked through the suction tube, and the fluid is returned to the return tube via the return channel. The control unit opens the solenoid valve to supply the fluid also to the delivery channel when it is identified that a fluid is an intended fluid.

3 Claims, 4 Drawing Sheets

(52) U.S. Cl.
 CPC .... *F01N 2610/14* (2013.01); *F01N 2610/1433* (2013.01); *F01N 2610/1473* (2013.01); *F01N 2900/1812* (2013.01); *Y02T 10/24* (2013.01); *Y10T 137/7736* (2015.04)

(56) References Cited

U.S. PATENT DOCUMENTS

| | | |
|---|---|---|
| 2008/0066531 A1 | 3/2008 | Kawanishi et al. |
| 2008/0184775 A1* | 8/2008 | Yamagishi et al. .......... 73/25.05 |
| 2009/0301059 A1 | 12/2009 | Toshioka et al. |
| 2012/0045378 A1* | 2/2012 | Soukhojak et al. ........... 423/212 |
| 2013/0000743 A1* | 1/2013 | Crary ......................... 137/15.04 |

FOREIGN PATENT DOCUMENTS

| | | |
|---|---|---|
| JP | 2007-263949 | 10/2007 |
| JP | 2008-274765 | 11/2008 |

\* cited by examiner

PUMPING DEVICE

This application is a U.S. National Stage application claiming the benefit of prior filed International Application Number PCT/JP2011/005674, filed Oct. 11, 2011, in which the International Application Number claim a priority date of Dec. 17, 2010 based on prior filed Japanese Patent Application Number 2010-281816, the entire contents of which are incorporated herein by reference.

TECHNICAL FIELD

The present application relates to a pumping device used, for example, in a selective catalytic reduction type exhaust emission control device. More particularly, it relates to a pumping device having an identifying function to allow cost reduction.

BACKGROUND ART

Conventionally, as a device which controls emission of exhaust of an engine by aftertreatment, there is known a selective catalytic reduction (SCR: Selective Catalytic Reduction) type exhaust emission control device which reduces nitrogen oxide (NOx) in the exhaust by using ammonia.

In this exhaust emission control device, a reduction catalyst for nitrogen oxide (NOx) is disposed in an exhaust passage, a urea aqueous solution supply device is disposed upstream of this nitrogen oxide (NOx) reduction catalyst, and an oxidation catalyst for defecating ammonia is disposed downstream thereof. Ammonia is generated by hydrolysis of urea added to the exhaust by the urea aqueous solution supply device, and this ammonia is supplied to the nitrogen oxide (NOx) reduction catalyst as a reducing agent. On the other hand, ammonia (ammonia slip) which has passed through the nitrogen oxide (NOx) reduction catalyst, without contributing to reduction of the nitrogen oxide (NOx), is oxidized and defecated with an ammonia defecate catalyser before emitted into the atmosphere.

In the selective catalytic reduction (SCR) type exhaust emission control device, in a container for a designated fluid, there has been needed a device that is referred to as an identification sensor which is a separate device from a pump, in addition to the pump for suction. A fluid to be used has been managed by utilizing such a device (see, for example, Patent Documents 1 and 2).

PRIOR ART DOCUMENT

Patent Document

Patent Document 1: Japanese Unexamined Patent Application Publication No. 2005-337969
Patent Document 2: Japanese Unexamined Patent Application Publication No. 2007-263949

DISCLOSURE

Problems to be Solved

However, in fluid kind identification method and fluid kind identification device in Patent Document 1 and fluid identification device and fluid identification method in Patent Document 2, increased cost has become a problem because of the necessity of the device that is referred to as the identification sensor which is a separate device from the pump, in addition to the pump for suction.

The present invention has been made in order to solve such a problem of prior art, and a proposition of the present invention is to provide a pumping device having an identifying function to allow cost reduction.

Means for Solving the Problems

A pumping device according to the present invention includes a suction tube equipped with a flowmeter, a pump connecting a return channel and a delivery channel to the suction tube, a return tube connected to the return channel, a solenoid valve disposed between the suction tube and the delivery channel, and a control unit identifying a fluid by a flow velocity difference of the flowmeter.

The solenoid valve closes the delivery channel when the fluid flows in, the flowmeter measures a flow rate of the fluid sucked through the suction tube, and the fluid is returned to the return tube via the return channel.

The control unit opens the solenoid valve to supply the fluid also to the delivery channel when it is identified that the fluid is an intended fluid.

The embodiment of the present invention has a pumping device according to the present invention mounted in a motor vehicle equipped with a selective catalytic reduction (SCR) type exhaust emission control device, and includes a container that retains urea, in which the solenoid valve closes the delivery channel when an engine of the motor vehicle is started, the flowmeter measures a flow rate of the urea sucked through the suction tube, and the urea is returned to the return tube via the return channel.

The control unit opens the solenoid valve to supply the urea also to the delivery channel when it is identified that the urea is intended urea.

In an embodiment of the present invention, the pump includes a combine fan coaxially coupled to the return channel and the delivery channel.

Effect of the Invention

According to the present invention, a process which is referred to as identification of the fluid can be added by inserting the flowmeter into a course of sucking operation of the pump, and thereby the conventional separate placement type identification sensor becomes unnecessary.

DETAILED DESCRIPTION OF THE EMBODIMENTS

Figure 1:
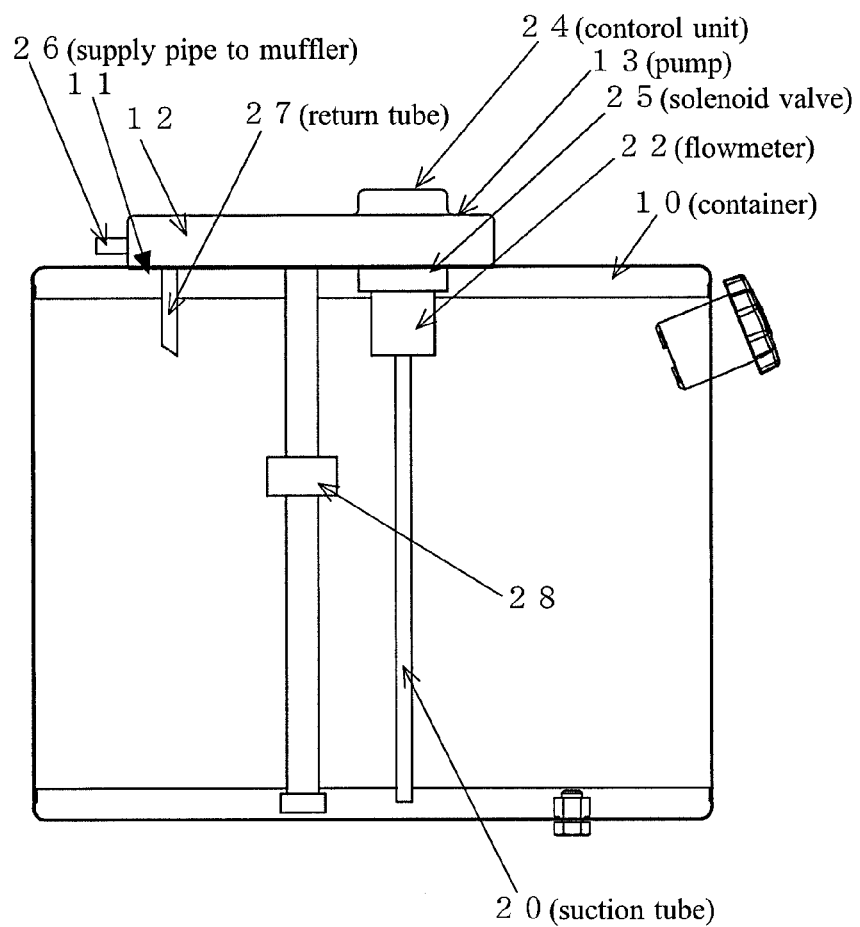
FIG. 1 is a partially cutaway side view showing a pumping device according to one embodiment of the present application.
Figure 2:
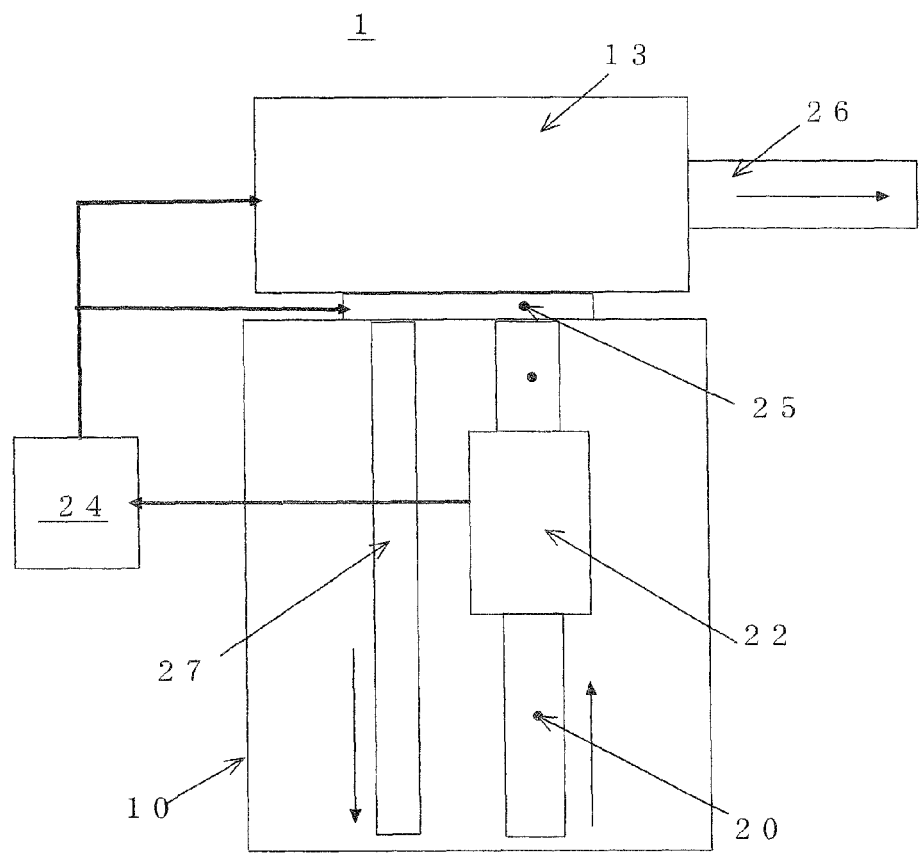
FIG. 2 is a configuration diagram of FIG. 1.
Figure 3:
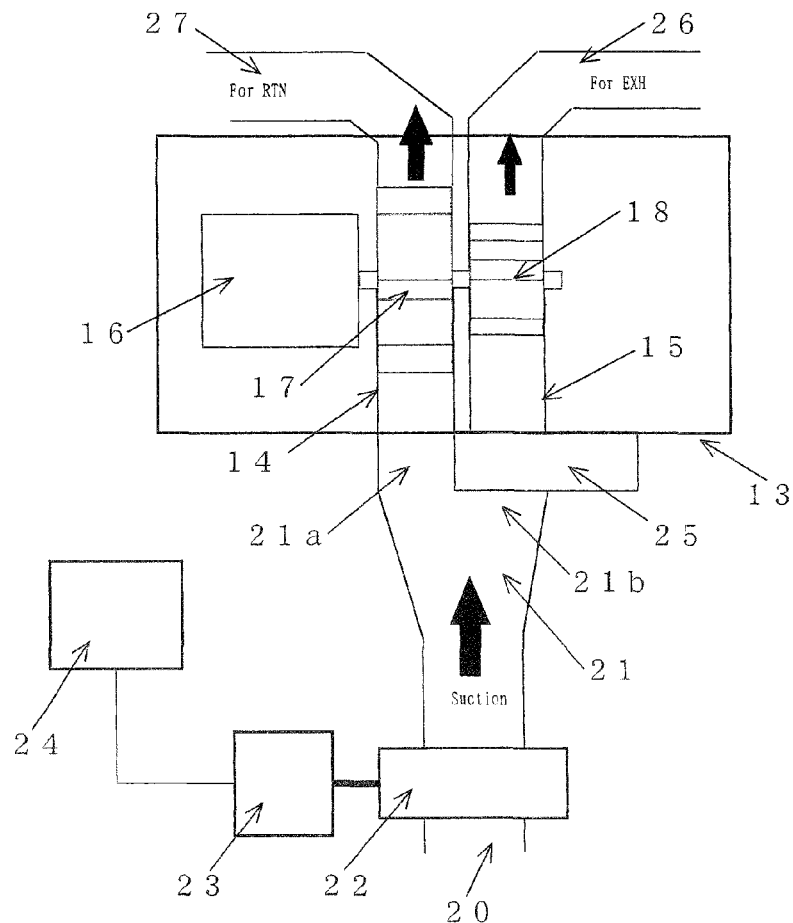
FIG. 3 is an illustration showing essential parts in FIG. 1.

Hereinafter, the present invention will be described based on embodiments shown in the drawings.

FIG. 1 to FIG. 4 show an example in which a pumping device 1 according to one embodiment of the present invention has been applied to a motor vehicle equipped with a selective catalytic reduction (SCR) type exhaust emission control device.

The pumping device 1 according to the present embodiment has a pump module 12 to be placed on an opening part 11 of a container 10 which retains urea.

The pump module 12 includes a pump 13 which has a return channel 14 to be connected to a return tube 27, a delivery channel 15 to be connected to a supply pipe 26 to a muffler, a first fan 17 arranged in the return channel 14, a second fan 18 arranged in the delivery channel 15 coaxially with the first fan 17, and a motor 16 for rotating the first fan 17 and the second fan 18.

Figure 4:
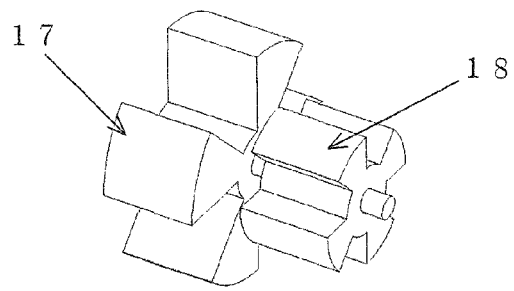
FIG. 4 is a perspective view of a combine fan used in FIG. 3.

The first fan 17 and the second fan 18 are constituted by a combine fan as shown in FIG. 4. Here, the main reason why the combine fan was adopted in the pump 13 is because a large flow rate difference of respective systems caused by a small amount of urea used as an SCR device is covered by one driving machine (motor), while a certain flow velocity is needed for flow rate measurement.

The return channel 14 and the delivery channel 15 are respectively connected side by side to pipelines 21a and 21b of a forked connecting pipe 21 which is disposed at an end of a suction tube 20 arranged in the container 10 and is formed to expand toward the downstream side.

The delivery channel 15 includes a solenoid valve 25 disposed at a boundary between the delivery channel and the one pipeline 21b of the forked connecting pipe 21. The solenoid valve 25 is controlled to open and close by a later described control unit 24.

A flowmeter 22 is arranged on the suction tube 20.

The flowmeter 22 is configured to communicate with the control unit (CPU) 24 and to identify whether a fluid flowing within the suction tube 20 is urea by a difference in flow rate.

Here, a flow velocity measuring method in the present embodiment will be described.

In the present embodiment, the control unit 24 calculates the flow velocity from a flow rate per unit time (though different depending on pumping power, it is about 10 seconds to 1 minute) and a pipeline cross-sectional area of the return tube 27.

When an electromagnetic flowmeter is adopted, since flow rate measurement becomes impossible at the stage of a non-conductive fluid being mixed into it, an empty determination or an NG determination can be made (the conductivity of urea is different from that of petroleum or water).

Next, a relationship between the pump 13 and the solenoid valve 25 in the present embodiment will be described.

In the present embodiment, when an SCR system is started, the control unit 24 closes the solenoid valve 25. The pump 13 sucks urea by the suction tube 20 to flow from the return channel 14 only into the return tube 27. A mechanism is such that, when the control unit 24 determines that a flow velocity measured by the flowmeter 22 has matched preset data, the control unit 24 opens the solenoid valve 25 and causes urea to be sucked to flow into both of the return tube 27 and the supply pipe 26 to the muffler.

The return tube 27 which is arranged in the container 10 is connected to the return channel 14.

A fluid surface level gauge 28 is disposed in the container 10.

Next, an operation of the pumping device 1 according to the present embodiment will be described.

First, when starting an engine (ACC) of the motor vehicle equipped with the selective catalytic reduction (SCR) type exhaust emission control device to which the pumping device 1 according to the present embodiment is applied, the control unit 24 drives the motor 16 of the pump 13 for, for example, about 20 seconds to 30 seconds in a state of closing the solenoid valve 25 (100% return) and measures the flow velocity by the flowmeter 22 (drive time: since a sampling time depends on the performance of the pump and the accuracy of a flowmeter to be used, the value is used as a reference).

When the control unit 24 determines that a measured value thereof has matched a preset value, the SCR system becomes an enabled state. After the system has received a signal instructing injection of urea into the supply pipe 26 to muffler after READY (this control is same as before), the control unit 24 opens the solenoid valve 25 to supply several % of the total flow rate toward the supply pipe 26 to the muffler.

At this stage also, the control unit 24 always keeps monitoring the fluid via the flowmeter 22, and when a false fluid is mixed into it after the engine is started, the control unit 24 immediately closes the solenoid valve 25 to perform re-measuring and fluid determination. When it is still NG, the control unit sends an abnormal signal to the meter. Also, the control unit 24 controls output of the pump 13.

Next, reasons why the embodiment has a structure of returning urea to the return side without fail also at the time of injection of urea will be described.

The reasons include monitoring of an aqueous solution by the control unit 24 based on the flow rate by the flowmeter 22 at all times, preventing accidents by closing the solenoid valve 25 when a non-regulated fluid (diesel oil or oil) is intentionally mixed into the aqueous solution after engine is started, and being capable of obtaining a flow rate required for detection by returning urea to the return tube 27 side since a sufficient flow rate cannot be obtained at a usual urea use level.

As described above, according to the present embodiment, since a flow velocity of the fluid sucked by the pump 13 measured when passing through the flowmeter 22 differs depending on the density of the fluid, the fluid is returned to the return tube 27 through the solenoid valve 25 when the measured flow velocity is different from the flow velocity set in advance in the control unit 24. When an initially set flow velocity is not obtained after repeating the above several times, it is determined to be abnormal (an unspecified fluid has been put into it), and the abnormal signal is output.

If urea (specific gravity: 1.1) is set as a qualified fluid, its flow velocity will be increased when sucking diesel oil (specific gravity: 0.8). The control unit 24 detects the difference in flow velocity and switches to the return tube 27 side. Therefore, distribution of the false fluid to an atomizer side can be blocked.

In the present embodiment, a total supply amount of urea is calculated by, for example, the pipeline sectional area and a rotational frequency of the motor, and ON-OFF of the valve. For example, since there remains an amount to be returned even when urea is supplied to the atomizer side, it is not simply added but an actual supply amount can be given as data by the flow rate (or the motor rotational frequency)+an opening/closing time of the solenoid valve (it is considered that what percentage of urea supplied to the atomizer side is returned can be set by a design value) in the present embodiment.

While a case of application to the urea SCR device has been described in the above-mentioned embodiment, the present invention is not limited to this and its application to, for example, the field of dairy farming industry can be considered.

Figure 5:
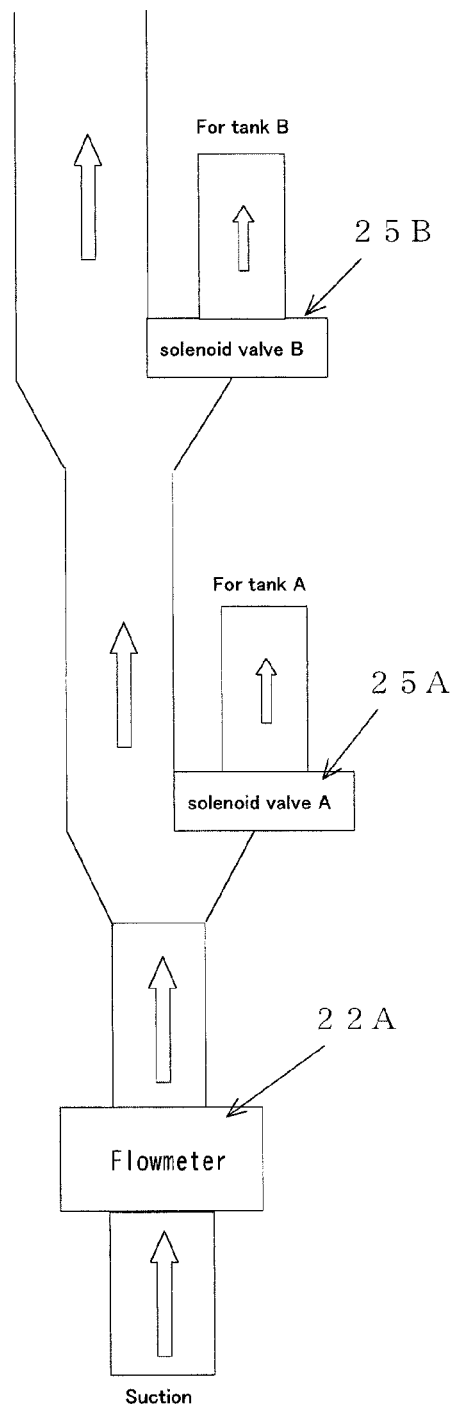
FIG. 5 is an illustration showing a pumping device according to another embodiment of the present application.

FIG. 5 shows an example that the milk fat content is discriminated in accordance with information obtained from a flowmeter 22A.

In this device, packaging according to milk fat content becomes possible by controlling open and close of solenoid valves 25A and 25B by such information. A tank A is accessible when solenoid valve 25A is open, and a tank B is accessible when solenoid valve 25B is open.

Through the use of this device, classification according to milk fat content becomes possible at the packaging stage even if an ingredient is randomly placed into a pasteurizer.

In addition, the present invention is applicable when separating a mixture of two or more kinds of fluids in, for example, an oily water separator, a waste fluid storage tank and the like.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A pumping device, comprising:
a suction tube;
a flowmeter disposed on the suction tube;
a pump including a return channel and a delivery channel, and connecting the return channel and the delivery channel to the suction tube;
a return tube connected to the return channel;
a solenoid valve disposed between the suction tube and the delivery channel, wherein the return channel remains constantly open; and
a control unit identifying a fluid by a flow velocity difference of the flowmeter, wherein
the solenoid valve closes the delivery channel when the fluid flows in, the flowmeter measures a flow rate of the fluid sucked through the suction tube, and the fluid is returned to the return tube via the return channel, and
the control unit opens the solenoid valve and opens the delivery channel to supply the fluid also to the delivery channel when it is identified that the fluid is an intended fluid;
wherein the pump further comprises a first fan provided in the return channel and a second fan provided in the delivery channel, the first fan is coaxially coupled to the second fan, and the first fan is configured to operate simultaneously with the second fan.

2. A pumping device to be used in a motor vehicle equipped with a selective catalytic reduction (SCR) type exhaust emission control device, comprising:
a container retaining urea;
a suction tube arranged in the container;
a flowmeter disposed on the suction tube;
a pump located at an opening side of the container, including a return channel and a delivery channel, and connecting the return channel and the delivery channel to the suction tube;
a return tube arranged in the container and connected to the return channel;
a solenoid valve disposed between the suction tube and the delivery channel, wherein the return channel remains constantly open; and
a control unit identifying urea by a flow velocity difference of the flowmeter, wherein:
the solenoid valve closes the delivery channel when an engine of the motor vehicle is started, the flowmeter measures a flow rate of the urea sucked through the suction tube, and the urea is returned to the return tube via the return channel, and
the control unit opens the solenoid valve and opens the delivery channel to supply the urea also to the delivery channel when it is identified that the urea is intended urea; and
wherein the pump further comprises a first fan provided in the return channel and a second fan provided in the delivery channel, the first fan is coaxially coupled to the second fan, and the first fan is configured to operate simultaneously with the second fan.

3. A pumping device comprising:
a pump comprising a return channel and a delivery channel;
a suction tube connected to the return channel and the delivery channel, wherein the return channel remains constantly open to the suction tube;
a valve disposed between the suction tube and the delivery channel;
a flowmeter disposed on the suction tube; and
a control unit configured to identify a fluid by a flow velocity difference measured by the flowmeter, wherein the control unit is configured to close the solenoid valve when the fluid flowing in the suction tube is not an intended fluid and open the solenoid valve when the fluid flowing in the suction tube is the intended fluid;
wherein the pump further comprises a first fan provided in the return channel and a second fan provided in the delivery channel, the first fan is coaxially coupled to the second fan, and the first fan is configured to operate simultaneously with the second fan.

* * * * *